Patented July 23, 1929.

1,721,929

UNITED STATES PATENT OFFICE.

OTTO J. STEINWAND, OF SELMA, CALIFORNIA, ASSIGNOR TO THE RUBYETTE CO., OF SAN FRANCISCO, CALIFORNIA, A CORPORATION OF CALIFORNIA.

PROCESS FOR PEELING FRUITS.

No Drawing.    Application filed June 14, 1926.   Serial No. 116,030.

My invention relates to a process for preparing fruits, and more particularly to a process for peeling grapes, plums, prunes and other fruits which are not successfully peeled by other known methods.

The object I have accomplished is the discovery and invention of a process for peeling grapes, plums, prunes and similar fruits in which the skins adhere closely to the pulp, such process leaving the peeled fruit smooth, plump and well appearing. Other objects will hereinafter appear. Such peeling is desirable preliminary to canning, glacéing, preserving or drying the fruit. In peeling fruits, such as peaches, in which the skin is readily loosened, it has heretofore been the practice to dip the fruit in a hot solution of caustic soda or lye until the skins have been loosened from the fruits, after which the skin is readily slipped off. This process fails with fruits which have a hard, dense or tight sticking skin, which is cracked into checks by the action of the lye, the lye then eating deeply into the pulp through the cracks before the skin bounded by the checks is loosened or dissolved. In my process the fruits are first dipped into hot water, or into a weak solution of hot water and caustic soda (the strength of the caustic soda should be three per cent or less), or hot water and carbonate of soda, or a neutral or acid sulphite of soda solution. The carbonate of soda and the sulphite of soda solution can be as strong as ten per cent, although the nature of the fruit generally demands a much weaker solution. These solutions must not be strong enough to check, or to crack the skin. In some cases it is preferable to dip the fruit into a weak caustic soda solution and then redip it in a neutral or acid sulphite of soda solution. The temperature required is from 170° F. to 212° F. or higher, according to the nature and condition of the fruit. The time required in this dipping is relatively short, varying from one minute to one and one-half minutes so that the cooking or scalding will be limited to the surface or skin of the fruit. The higher the temperature of the solution used, the shorter the time required for dipping the fruit therein. Where a higher temperature than 212° F. is required, sulphate of soda may be added to the solution to raise its boiling point.

The object of the first dipping is to scald or cook the skin, and to soften it and render it porous so that it will uniformly dissolve by the action of lye, and come off evenly without cracking or checking when subjected to the lye peeling process. This dipping should not cook the pulp.

If the fruit is of such kind and texture as to require sulphuring, it can now be done by any of the usual methods. The fruit is then wilted or partially dried by placing it in the sun or in any suitable dehydrating means or process to slacken the skin which will prevent cracking and splitting of the skin when in the lye or peeling solution, and also to concentrate the sweet juices of the fruit to case harden it to such a degree that the pulp directly under the skin will resist the action of lye. The term "case harden" as used above is intended to mean a condition of the fruit wherein the surface of the pulp beneath the skin is slightly dried so that a concentration of sugar will be present which will form what might be termed a casing of sugar thereabout. There is no exact method whereby the time required for this operation can be determined except by experiment. When properly carried out, the fruit after being peeled will appear full and smooth, which condition will indicate that the lye has not attacked the pulp, the presumption in this case being that the casing was sufficient to prevent such action. On the other hand, should this step be improperly carried out and the casing insufficient to protect the pulp, it will be found to be flayed and ragged in appearance, indicating that the lye has attacked the pulp. In some cases the fruit is placed in condition for peeling after the first dipping above referred to, and without the wilting or drying. The entire object to be accomplished by this first step in the process is to get the skin in condition so it will be uniformly acted upon by the lye peeling solution.

The fruit thus prepared is then dipped into a substantially boiling solution of from one half percent to ten percent of caustic soda for a time varying from 15 seconds to 3 minutes, according to the kind and condition of the fruit. The fruit is then washed in cold running water to remove all lye, and shreds of skin, and can then be soaked in water or weak syrup until plumped to full size.

The lye solution can be sprayed on the fruit, or the fruit may be dipped into a vessel containing the mixture.

Having described my invention, I claim as new and ask for Letters Patent:

1. A process for peeling fruits consisting of immersing the fruit in hot soda water, then wilting the fruit, then placing it in a lye bath, and then washing the lye therefrom.

2. A process for peeling fruits consisting of immersing the fruit in a hot weak solution of water and soda, then drying the fruit, then placing it in a bath of lye and water, and thereafter washing the lye therefrom.

3. A process for peeling fruits consisting of softening the skin of the fruit, then wilting it, and then dissolving the skin by applying lye thereto.

4. A process for preparing fruits to be peeled by the application of a lye solution, consisting of softening the skin and wilting the fruit prior to application of the lye solution.

5. A process for peeling fruits having tough skins, such as grapes and plums, consisting of scalding the skins of the fruit until the skins thereon are softened and porous, then permitting the fruit to wilt and then subjecting the skins to the action of lye.

6. A process for peeling fruits having tough skins such as grapes and plums, consisting of softening the skins in a weak alkali solution, wilting the fruit to concentrate the sugars thereof at the surface and loosen the skin thereof, and finally dipping the fruit in a strong alkali solution at a substantially boiling temperature after which the skins and solution are washed therefrom.

OTTO J. STEINWAND.